(12) United States Patent
Nguyen et al.

(10) Patent No.: US 6,695,356 B2
(45) Date of Patent: Feb. 24, 2004

(54) CONNECTOR FOR SECURING CONDUITS

(75) Inventors: Dennis P. Nguyen, Houston, TX (US); Delbert E. Vanderford, Jr., Cypress, TX (US)

(73) Assignee: Cooper Cameron, Houston, TX (US)

( * ) Notice: Subject to any disclaimer, the term of this patent is extended or adjusted under 35 U.S.C. 154(b) by 110 days.

(21) Appl. No.: 09/992,083

(22) Filed: Nov. 19, 2001

(65) Prior Publication Data

US 2003/0095830 A1 May 22, 2003

(51) Int. Cl.$^7$ ................................................. F16L 37/00
(52) U.S. Cl. ............... 285/321; 285/123.4; 285/123.13; 285/309
(58) Field of Search ................. 285/321, 920, 285/305, 123.4, 123.9, 123.13, 309

(56) References Cited

U.S. PATENT DOCUMENTS

| | | | |
|---|---|---|---|
| 2,086,431 A | * 7/1937 | Penick et al. | 285/123.9 |
| 2,178,549 A | * 11/1939 | Block | 285/123.4 |
| 2,877,732 A | * 3/1959 | Eaton | 285/309 |
| 3,177,019 A | * 4/1965 | Osweiler | 285/321 |
| 3,768,842 A | * 10/1973 | Ahlstone | 285/321 |
| 4,068,865 A | * 1/1978 | Shanks, II | 285/309 |
| 4,606,557 A | * 8/1986 | Coffey | 285/309 |
| 4,830,408 A | * 5/1989 | Reimert | 285/321 |
| 5,020,593 A | * 6/1991 | Milberger | 285/922 |
| 5,026,200 A | 6/1991 | van Bilderbeek | 403/322 |
| 5,158,326 A | * 10/1992 | Anderson et al. | 285/917 |
| 5,498,042 A | * 3/1996 | Dole | 285/321 |
| 5,794,988 A | * 8/1998 | Gill | 205/321 |
| 5,951,066 A | * 9/1999 | Lane et al. | 285/406 |

* cited by examiner

*Primary Examiner*—Eric K. Nicholson
(74) *Attorney, Agent, or Firm*—Peter Bielinski; Mike Hartmann

(57) ABSTRACT

A connector for securing tubular members or conduits in sealed end to end relationship is disclosed. A split ring biased to an unlocked position is carried on the pin connection member in a recess. After the connection is made, the split ring is expanded through a window in the box connection member and locked in place. Alternative embodiments showing a split ring biased to a locked position and a split ring with an articulated joint are shown. A fourth embodiment that allows preloading of the split ring is shown also.

21 Claims, 8 Drawing Sheets

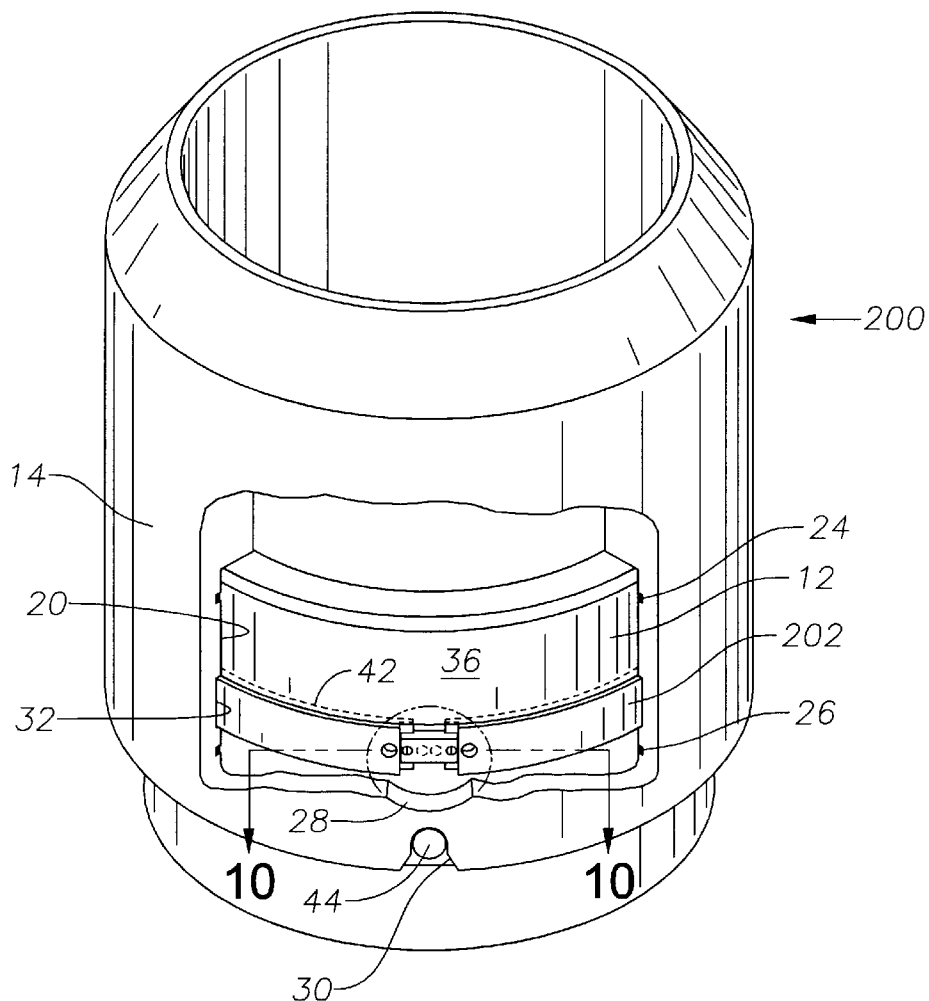
Fig. 9
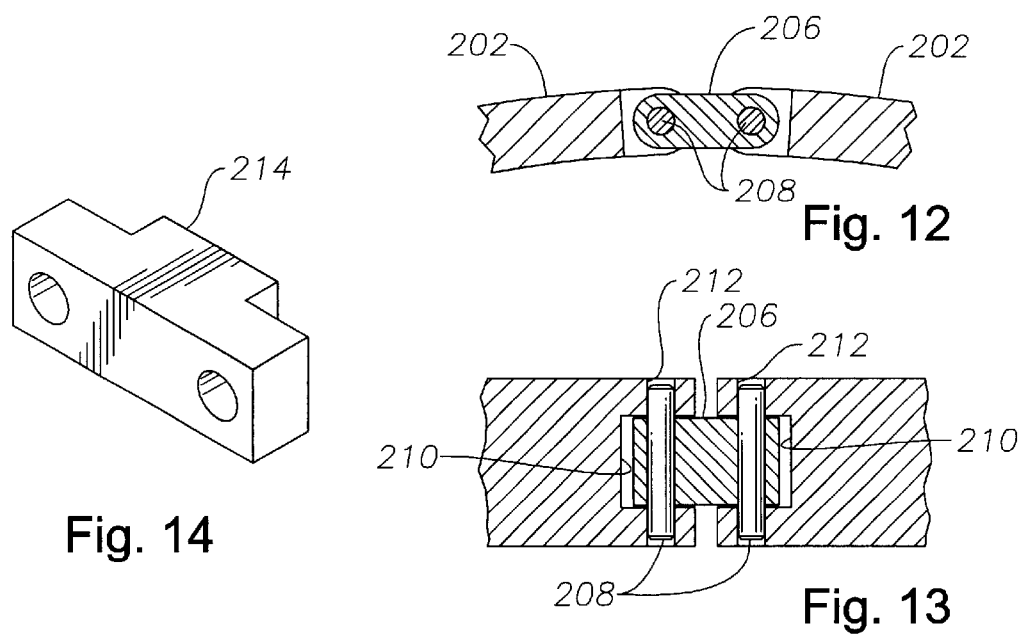
Fig. 12
Fig. 14
Fig. 13

CONNECTOR FOR SECURING CONDUITS

BACKGROUND OF THE INVENTION

1. Field of the Invention

This invention relates to a slim profile stab type connector that may provide automatic or manual locking capability. The connector provides a visual means to allow confirmation of whether the connector is locked or unlocked and an additional safety locking device to ensure the connector cannot be accidentally unlocked.

The use of stab type connectors is desirable for use in connecting tubular members or conduits in the oil and gas exploration and production industry. A connector of this type allows tubular conduits to be quickly and securely connected together in end to end relationship. These connectors can be used for connecting wellheads to large or small diameter casing or to connect wellhead to wellhead.

These connectors must be of rugged construction as they are required to handle large axial loads. These large axial loads may be due to the length of the conduit being supported as the connectors are used to connect numerous sections of conduit or "joints" as they are known in the oil and gas industry together as they are lowered into a pre-drilled hole in the ground. Additionally, large loads on these connectors may be generated by internal pressurization of the conduit. Finally, in some applications these connectors are used to connect conduit sections together as they are driven into the ground by pile driving equipment.

A connector that provides a quick means to connect and release conduits in end to end relationship is very desirable. Such a connector design should allow for visual verification that the connector is secured and allow for the provision of a safety lock to ensure the connector cannot be inadvertently unlocked while the connection is under load. Finally, such a connector should allow the use of flexible seal rings to ensure an easily field replaceable sealing system.

2. Description of Related Art

U.S. Pat. No. 5,026,200 to B. H. van Bilderbeek shows a releasable connector using a multiplicity of radial screws to release a contractible ring when it is desired to release the connector.

SUMMARY OF THE INVENTION

The present invention comprises a connector for securing tubular members or conduits in sealed end to end relationship. In a first embodiment, the connector includes a box connection member adapted to receive a pin connection member therein to form a sealed joint or connection. The outer ends of the pin and box connection members may have a butt weld connection or other suitable means as threaded ends for connecting the members to the tubular conduits. The pin and box connection members have complementary recesses or grooves diametrically opposite one another formed therein. A securing means in the form of a split ring is carried on the pin connection member in its recess. The ring is formed to be biased inward, i.e., in its relaxed position it is retracted to the inner wall of the pin connection member recess. The split ring is of a rectangular cross section and a close fit in the pin connection member recess. The ends of the split ring have a complementary pair of holes on each side of the split. One pair of holes is for securing the split ring to the pin connection member in a pair of complementary threaded holes before insertion into the box connection member and the second pair of holes are designed to accept threaded rods to aid in spreading the ring to move it to its locked position.

The box connection member has a pair of elastomer seal rings positioned on its interior to seal on either side of the split ring recess. A small circular window is formed in the exterior of the box connection member to allow visual inspection of the ends of the split ring. Additionally, an orientation pin is formed on the exterior of the pin connection member that coacts with an orientation slot in the box connection member to ensure the inspection window in the box connection member is aligned with the ends of the split ring. Finally, a wedge block is provided for insertion between the ends of the split ring after the ends of the split ring are spread and the split ring has locked the pin connection members together.

A second embodiment uses the same configuration for the pin and box connection members but the split ring is biased outward, i.e., in its relaxed position it will lie approximately halfway in each of the recesses of the pin and box connection members and lock the members together. The split ring is of a rectangular cross section and a close fit in the recesses as in the first embodiment. The ends of the split ring have complementary holes as in the first embodiment and function in the same manner. A wedge block is provided for insertion between the ends of the split ring as a safety lock although not required in this embodiment.

A third embodiment uses the same configuration for the pin and box connection members as in the previous embodiments but the split ring is biased inward as in the first embodiment. However, the split ring has a hinged joint opposite the open ends to reduce the stresses in the split ring as it is moved from the unlocked to locked positions. The ends of the split ring have complementary holes as in the first embodiment and function in the same manner with a wedge block provided for insertion between the ends of the split ring.

A fourth embodiment uses the same configuration for the pin and box connection members but with the box connection member being of a two part construction with an outer sleeve having a threaded engagement to the box connection member. The split ring is biased inward as in the first embodiment. An external cover plate is provided with spaced apart holes through which studs are inserted and threaded into mating holes in the ends of the split ring. This engagement holds the split ring in its expanded or locked position. Nuts are threaded onto the studs and tightened to lock the split ring and cover plate in position. At this point, the threaded outer sleeve may be rotated to preload the connection.

A principal object of the present invention is to provide a connector for securing conduits in end to end sealing relationship that is easily connected and released.

Another object of the present invention is to provide a connector that allows visual verification that the connector is secured and locked.

A further object of the present invention is to provide a connector with a safety lock to ensure the connector cannot be inadvertently unlocked while the connection is under load.

A final object of the present invention is to provide a connector that allows the use of flexible seal rings to ensure an easily field replaceable sealing system.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein:

FIG. 9 is a perspective view, partially in section, of the third embodiment of the connector of the present invention showing the details of the connector and securing means.

FIG. 12 is an enlarged plan view, partially in section, showing details of the articulated joint of the split ring securing means of FIG. 10.

FIG. 13 is an enlarged elevation view, partially in section, showing details of the articulated joint of the split ring securing means of FIG. 10.

FIG. 14 is a perspective view, showing the wedge block used with the embodiment of FIG. 10 to lock the split ring securing means in its locked position.

DESCRIPTION OF THE PREFERRED EMBODIMENTS

Figure 1:
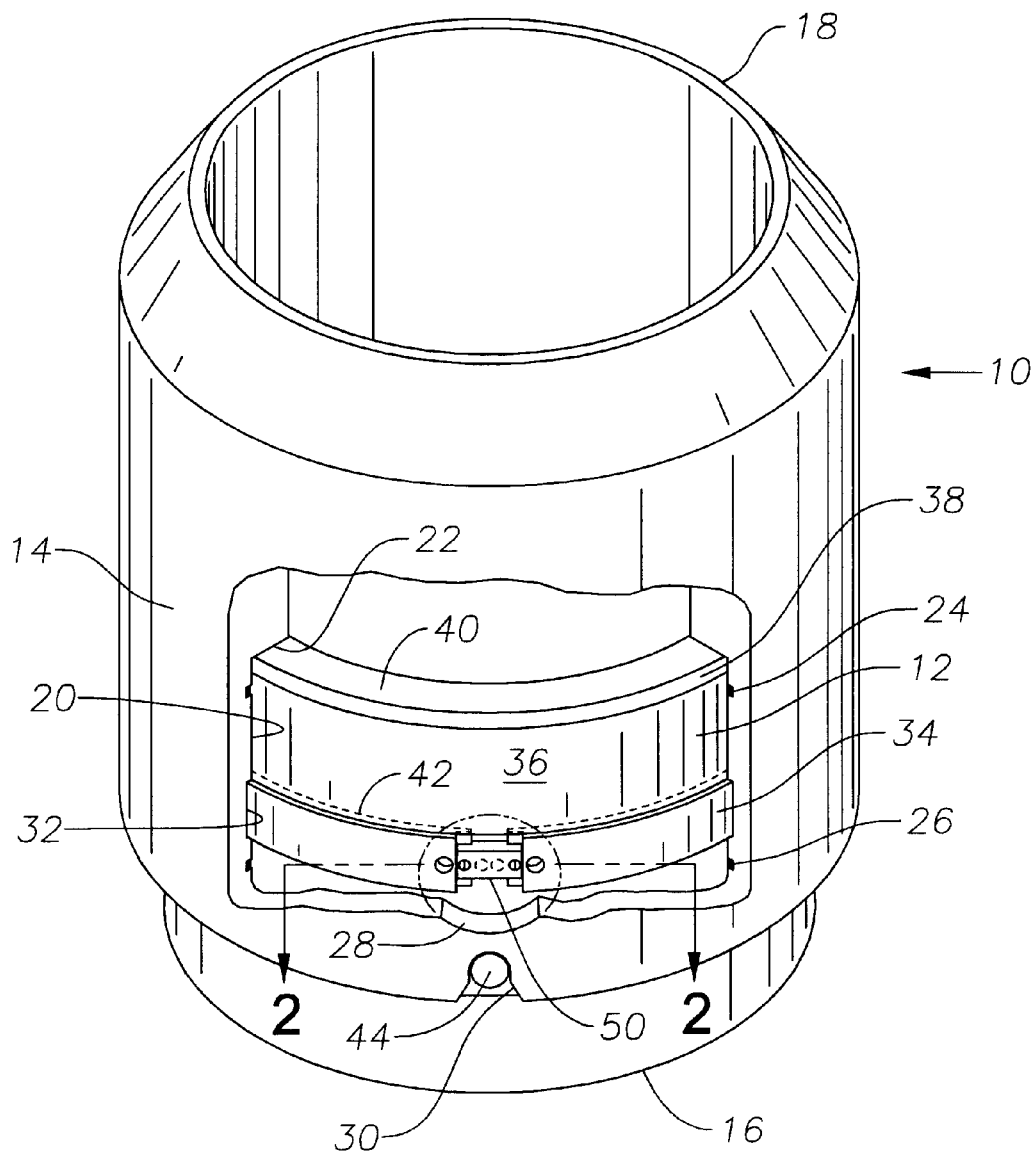
FIG. 1 is a perspective view, partially in section, of the first embodiment of the connector of the present invention showing the details of the connector and securing means.
Figure 4:
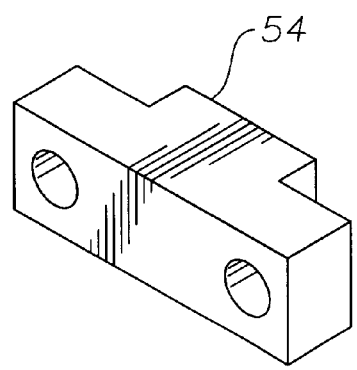
FIG. 4 is a perspective view, showing the wedge block used with the embodiment of FIG. 1 to lock the split ring securing means in its locked position.

With reference to the drawings, and particularly to FIG. 1, a perspective view, partially in section, of connector 10 of the present invention is shown. Connector 10 includes pin connection member 12 inserted into box connection member 14 in sealing engagement. Pin connection member 12 and box connection member 14 are generally tubular members with buff weld preparations 16 and 18 on their outer ends to allow for connection to a tubular member or conduit. Although shown with a butt weld connection, pin connection member 12 and box connection member 14 could be provided with alternate end connections as threads, flanges or clamp hubs without departing from the scope of the present invention.

Box connection member 14 includes counterbore 20 on its interior that is adapted to receive pin connection member 12 in close fitting engagement. Counterbore 20 provides shoulder 22 against which pin connection member 12 rests when inserted. Sealing means in the form of seal rings 24 and 26 are provided in counterbore 20. Seal ring 24 acts as a pressure seal ensuring pressure integrity between pin connection member 12 and box connection member 14 when locked together. Seal ring 26 acts as a barrier seal or "trash" seal to preclude debris from fouling the seal area. Box connection member 14 includes aperture or inspection window 28 extending through its outer wall. Although a large section is shown removed in FIG. 1, this is only for illustration purposes. In actual construction, only small aperture or inspection window 28 extends through the wall of box connection member 14. Alignment slot 30 is formed in the exterior wall of box connection member 14 immediately below inspection window 28 for purposes to be explained hereinafter. Recess or groove 32 is formed in counterbore 20 to receive securing means or split ring 34.

Pin connection member 12 includes exterior seal surface 36 formed on its exterior to fit in close sealing engagement with seal rings 24 and 26 of box connection member 14 when pin connection member 12 is inserted into box connection member 14. The outer end of seal surface 36 includes tapered edge 38 that ends in end shoulder 40. End shoulder 40 is designed to rest against shoulder 22 of box connection member 14 and provide a substantial surface interface and allow pin connection member 12 and box connection member 14 to be used as pile driving connectors, if desired. Recess or groove 42 is formed in seal surface 36 to accept split ring 34. Recesses 32 and 42 are diametrically opposite one another when pin connection member 12 is fully inserted into box connection member 14 and shoulders 22 and 40 are in contact. Alignment pin 44 is located on the exterior of pin connection member 12 for purpose to be explained hereinafter.

Figure 2:
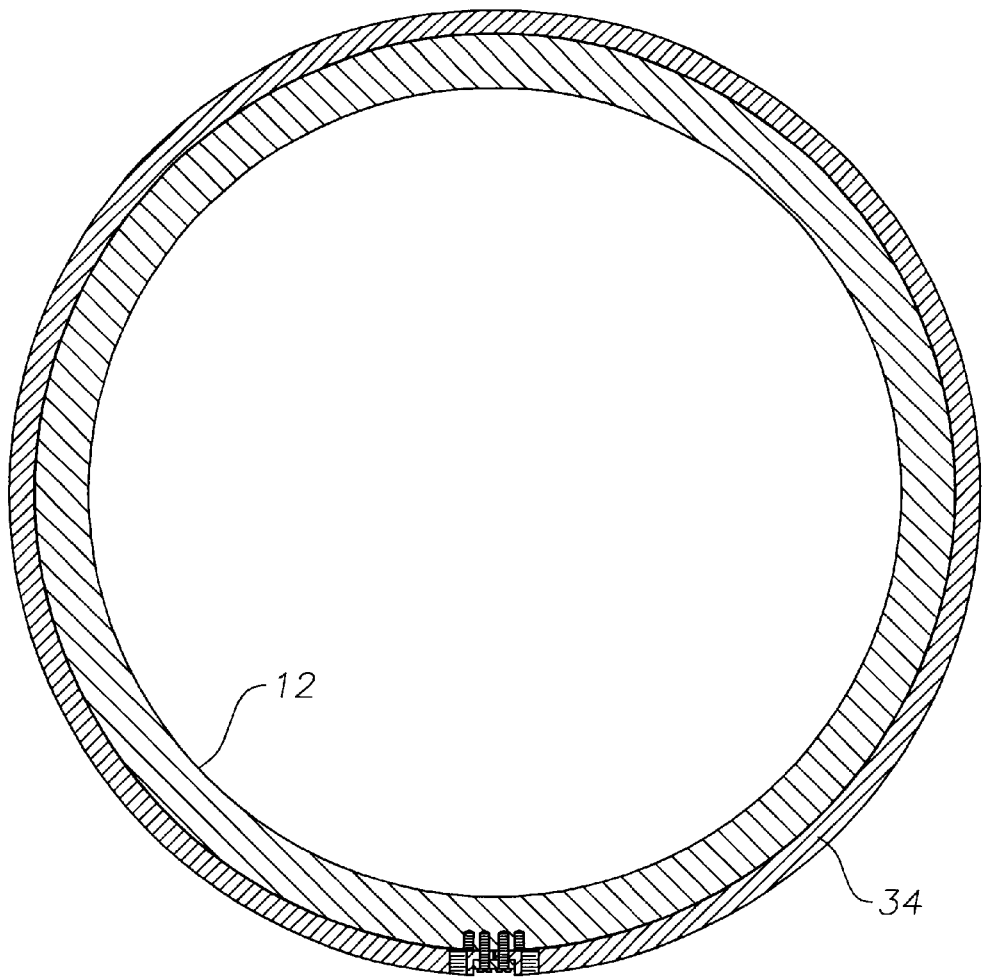
FIG. 2 is a sectional view, taken along lines 2—2 of FIG. 1, showing the split ring securing means.
Figure 3:
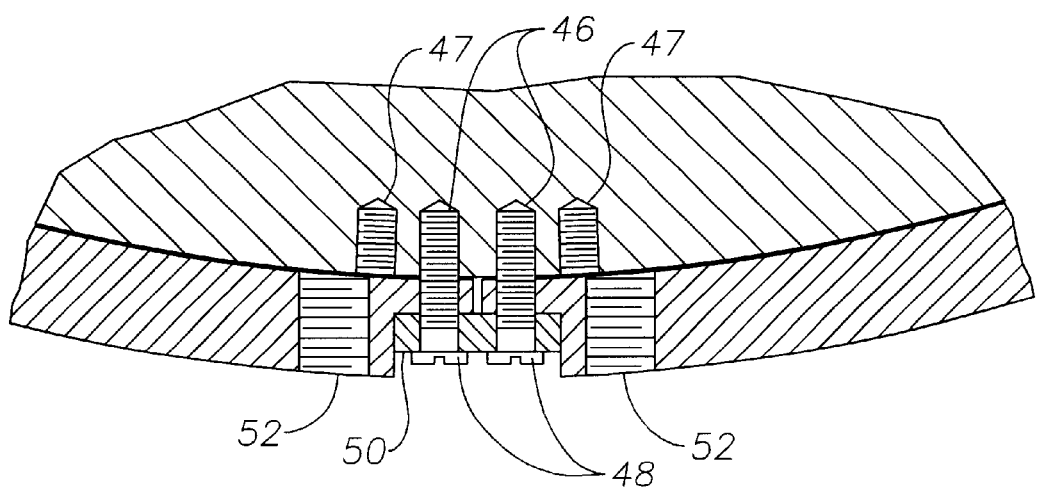
FIG. 3 is a partial sectional view, showing the details of the retainer means used to retain the split ring in the unlocked position.

Referring to FIG. 2, details of the construction and fit of split ring 34 to pin connection member 12 are shown. Split ring 34 is of a generally rectangular cross section and is formed to be a close fit in recess 42 of pin connection member 12 in its relaxed position. Shown in greater detail in FIG. 3, retainer means including threaded holes 46 and 47 in recess 42 and threaded fasteners 48 are provided to ensure split ring 34 remains in its relaxed or contracted state during insertion of pin connection member 12 into box connection member 14. Spacer block 48 is provided to provide rigidity to the open ends of split ring 34.

In the field, as pin connection member 12 is inserted into box connection member 14, split ring 34 is retained in the position shown in FIG. 2. As pin connection member 12 is inserted into box connection member 14, pin connection member 12 and box connection member 14 are rotated so that alignment pin 44 is aligned with alignment slot 30. This alignment ensures that the ends of split ring 34 are aligned with inspection window 28, as shown in FIG. 1. Threaded fasteners 48 and spacer block 50 are then removed. Spreader means in the form of threaded holes 52 are located adjacent the ends of split ring. Threaded studs or eyebolts are then threaded into threaded holes 52 through inspection window 28 and split ring 34 is spread apart until locking means in the form of wedge block 54 can be inserted between the ends of split ring 34. Wedge block 54 is secured to pin connection member 12 with fasteners 48 engaging holes 47 as shown in FIG. 1. This ensures split ring 34 will stay in its expanded position wherein it lies approximately half in each of recesses 32 and 42 and thereby locks pin connection member 12 to box connection member 14. If it is desired to disconnect pin connection member 12 from box connection member 14, wedge block 54 is removed, split ring 34 is secured in its retracted position and pin connection member 12 is pulled from box connection member 14.

A second embodiment of the present invention is shown in FIGS. 5–8 that is similar to the first embodiment but utilizes a securing means or split ring that is biased outwards, i.e., in its relaxed position it will lie approximately halfway in each of the recesses of the pin and box connection members and lock the members together. Those items which are the same as in the first embodiment retain their numerical designation. Connector 100 includes pin connection member 12 inserted into box connection member 14 in sealing engagement.

Box connection member 14 includes counterbore 20 on its interior that is adapted to receive pin connection member 12 in close fitting engagement. Box connection member 14 includes aperture or inspection window 28 extending through its outer wall. Although a large section is shown removed as in FIG. 1, this is only for illustration purposes. In actual construction, only small aperture or inspection window 28 extends through the wall of box connection member 14. Recess or groove 32 is formed in counterbore 20 to receive securing means or split ring 102.

Pin connection member 12 includes exterior seal surface 36 formed on its exterior to fit in close sealing engagement with seal rings 24 and 26 of box connection member 14 when pin connection member 12 is inserted into box connection member 14 as in the first embodiment. Recess or groove 42 is formed in seal surface 36 to accept split ring 102. Recesses 32 and 42 are diametrically opposite one another when pin connection member 12 is fully inserted into box connection member 14.

Figure 6:
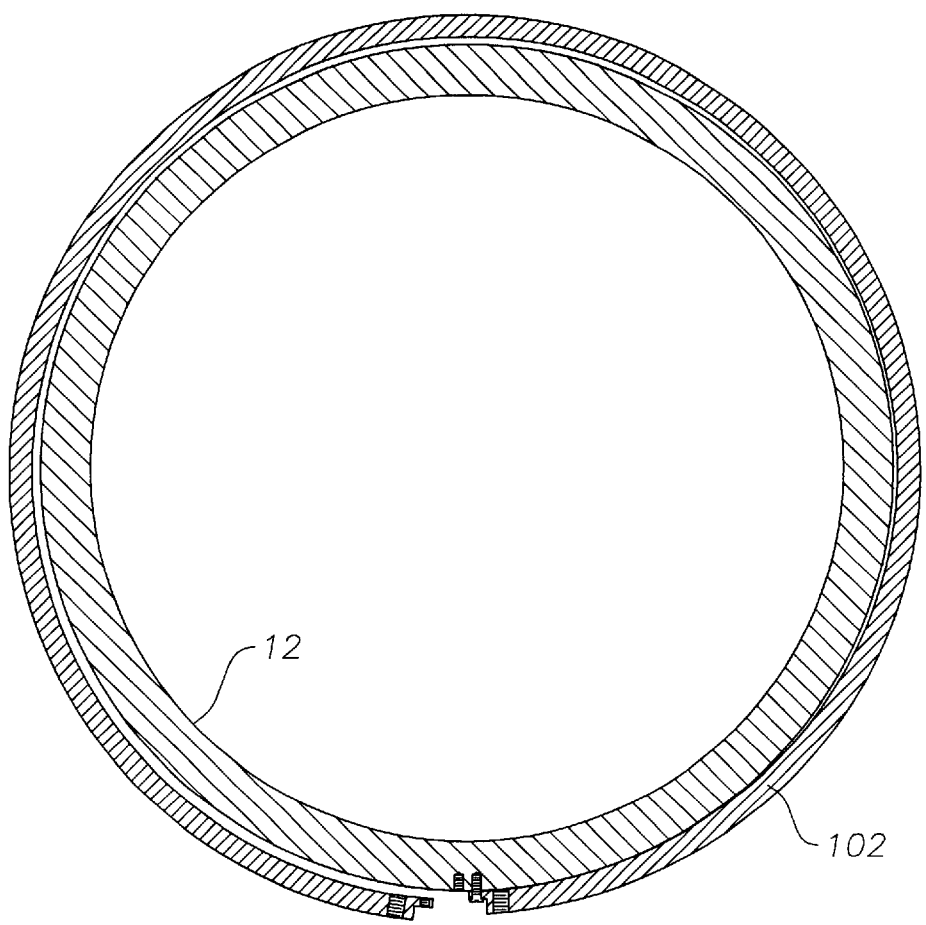
FIG. 6 is a sectional view, taken along lines 6—6 of FIG. 5, showing the split ring securing means.

Referring to FIG. 6, details of the construction and fit of split ring 102 to pin connection member 12 are shown. Split ring 102 is of a generally rectangular cross section and is formed to be biased outward, i.e., in its relaxed position it will lie approximately halfway in each of the recesses of the pin and box connection members and lock the members together. This configuration requires that split ring 102 be contracted or compressed to a closed position where it is tight fitting on pin connection member 12 before insertion. This position is shown in FIG. 7 where split ring 102 has been compressed and retained by retainer means including threaded holes 46 in recess 42 and threaded fasteners 48 are provided to ensure split ring 102 remains in a contracted state during insertion of pin connection member 12 into box connection member 14.

Figure 5:
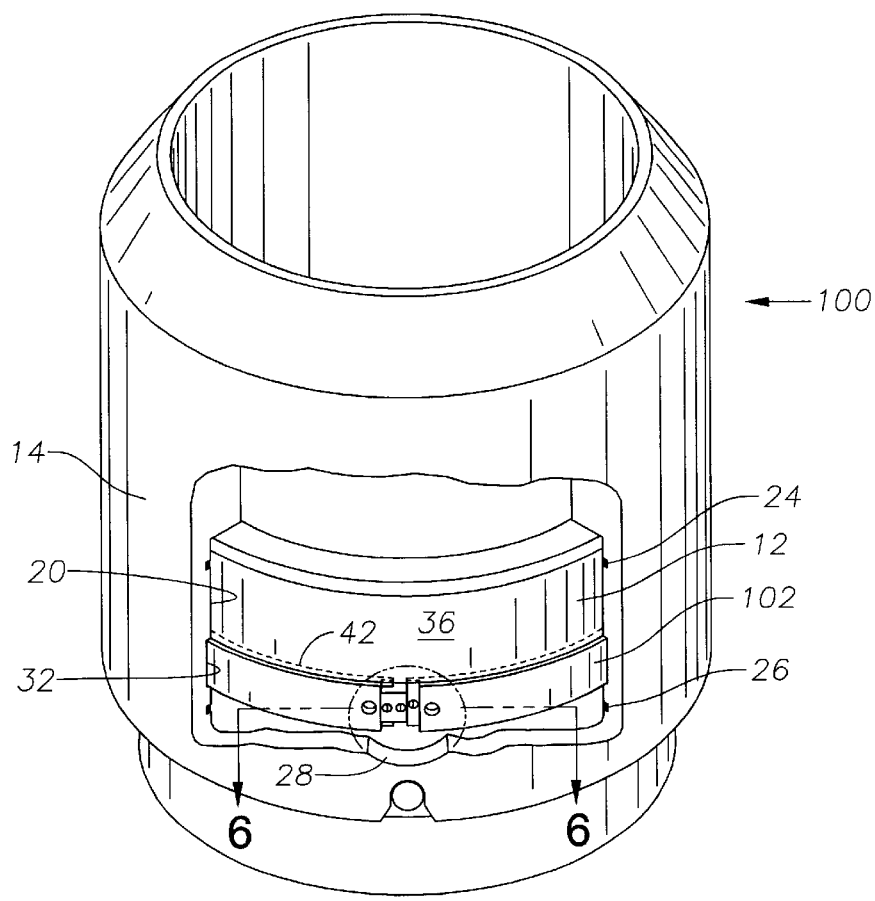
FIG. 5 is a perspective view, partially in section, of the second embodiment of the connector of the present invention showing the details of the connector and securing means.
Figure 7:
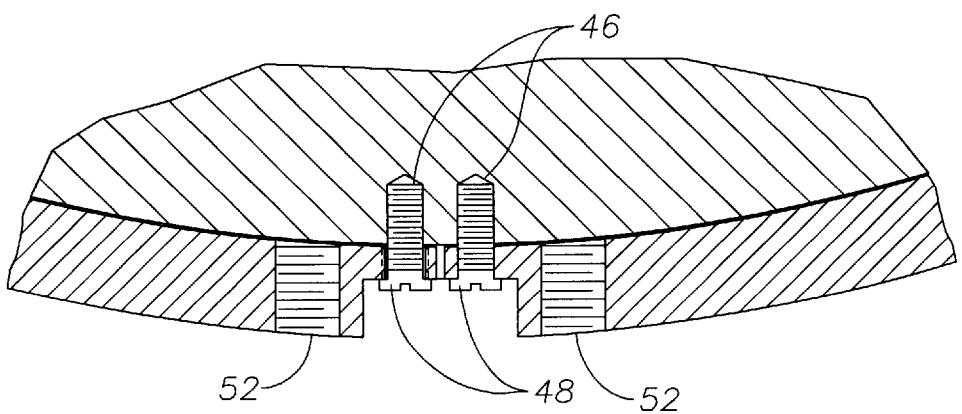
FIG. 7 is a partial sectional view, showing the details of the retainer means used to retain the split ring in the unlocked position.

In the field, as pin connection member 12 is inserted into box connection member 14, split ring 102 is retained in the position shown in FIG. 7. After alignment of alignment pin 44 with alignment slot 30, one of the threaded fasteners 48 is then removed. At this point, split ring 102 will spring to its relaxed, i.e., expanded position as shown in FIG. 6 and pin connection member 12 and box connection member 14 are securely locked together. If it desired, a locking means in the form of wedge block 104 may be inserted between the open ends of split ring 102. Spreader means in the form of threaded holes 52 are located adjacent the ends of split ring 102. Threaded studs or eyebolts may be threaded into threaded holes 52 through inspection window 28 as in the first embodiment and wedge block 104 can be inserted between the ends of split ring 102. Wedge block 104 is secured to pin connection member 12 as shown in FIG. 5. This ensures split ring 102 cannot be compressed and thereby inadvertently unlock pin connection member 12 from box connection member 14. If it is desired to disconnect pin connection member 12 from box connection member 14, wedge block 104 is removed, split ring 102 is secured in its retracted position and pin connection member 12 is pulled from box connection member 14.

A third embodiment of the present invention is shown in FIGS. 9–14 that is similar to the first embodiment but utilizes a hinged or articulated joint in the securing means or split ring. The split ring is formed to be biased inward, i.e., in its relaxed position it is retracted to the inner wall of the pin connection member recess. Those items which are the same as in the first and second embodiments retain their numerical designation. Connector 200 includes pin connection member 12 inserted into box connection member 14 in sealing engagement.

Box connection member 14 includes counterbore 20 on its interior that is adapted to receive pin connection member 12 in close fitting engagement. Box connection member 14 includes aperture or inspection window 28 extending through its outer wall. Although a large section is shown removed as in FIGS. 1 and 5, this is only for illustration purposes. In actual construction, only small aperture or inspection window 28 extends through the wall of box connection member 14. Recess or groove 32 is formed in counterbore 20 to receive securing means or split ring 202.

Pin connection member 12 includes exterior seal surface 36 formed on its exterior to fit in close sealing engagement with seal rings 24 and 26 of box connection member 14 when pin connection member 12 is inserted into box connection member 14 as in the first embodiment. Recess or groove 42 is formed in seal surface 36 to accept split ring 202. Recesses 32 and 42 are diametrically opposite one another when pin connection member 12 is fully inserted into box connection member 14.

Figure 10:
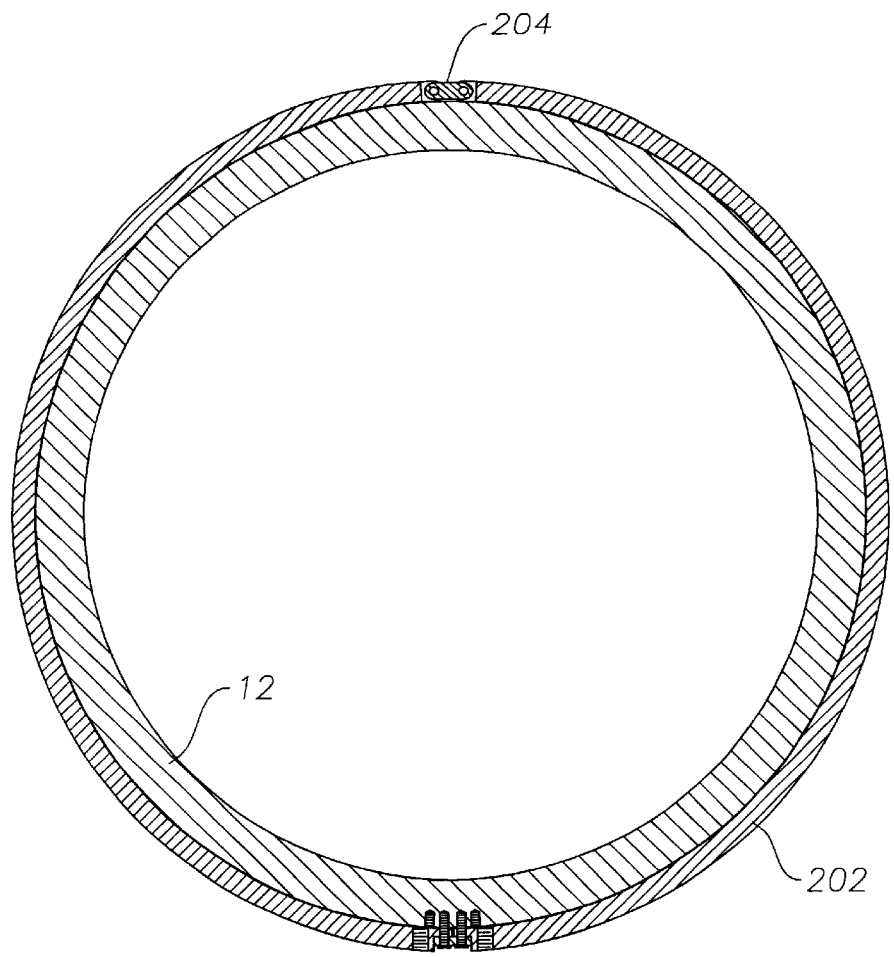
FIG. 10 is a sectional view, taken along lines 10—10 of FIG. 9, showing the split ring securing means with an articulated joint.

Referring to FIG. 10, details of the construction and fit of split ring 202 to pin connection member 12 are shown. Split ring 202 is of a generally rectangular cross section and is formed to be biased inward, i.e., in its relaxed position it will be a close fit in recess 42 of pin connection member 12. Shown in greater detail in FIG. 11, retainer means including threaded holes 46 in recess 42 and threaded fasteners 48 are provided to ensure split ring 204 remains in its relaxed or contracted state during insertion of pin connection member 12 into box connection member 14. Spacer block 50 is provided to provide rigidity to the open ends of split ring 34.

Opposite the open ends of split ring 202 is hinged or articulated joint 204, the details of which are shown in FIGS. 12 and 13. Articulated joint 204 includes hinge 206 and hinge pins 208. Slots 210 are formed in the ends of split ring 202 and intersected by holes 212. Hinge 206 and hinge pins 208 are inserted therein to form articulated joint 204. Articulated joint 204 allows the flexure of split ring 202 without inducing large bending stresses in split ring 202 and reducing the effort needed to move split ring 202 between its locked and unlocked positions.

Figure 11:
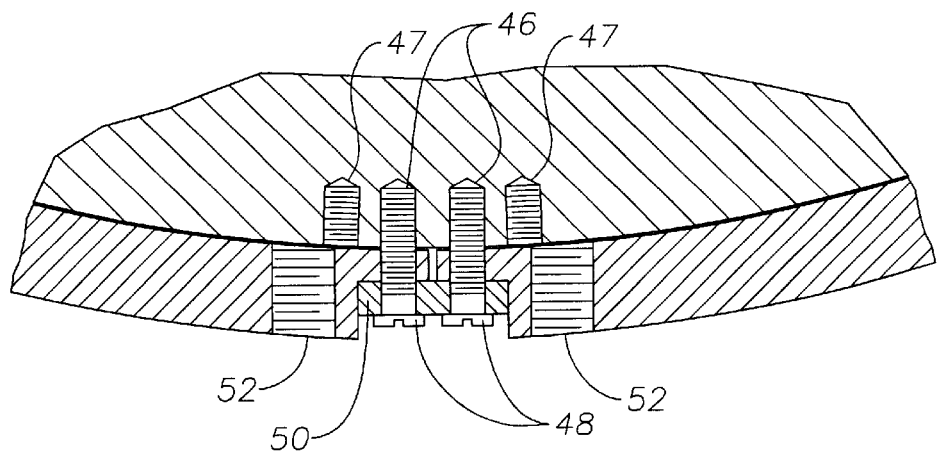
FIG. 11 is a partial sectional view, showing the details of the retainer means used to retain the split ring in the unlocked position.

In the field, as pin connection member 12 is inserted into box connection member 14, split ring 202 is retained in the position shown in FIG. 11. As pin connection member 12 is inserted into box connection member 14, pin connection member 12 and box connection member 14 are rotated so that alignment pin 44 is aligned with alignment slot 30. Threaded fasteners 48 and spacer block 50 are then removed. Spreader means in the form of threaded holes 52 are located adjacent the ends of split ring 202. Threaded studs or eyebolts are then threaded into threaded holes 52 through inspection window 28 and split ring 202 is spread apart until locking means in the form of wedge block 214 can be inserted between the ends of split ring 202. Wedge block 214 is secured to pin connection member 12 with fasteners 48 and holes 47 as shown in FIG. 9. This ensures split ring 34 will stay in its expanded position wherein it lies approximately half in each of recesses 32 and 42 and thereby locks pin connection member 12 to box connection member 14.

Figures 8, 15, 16, 17:
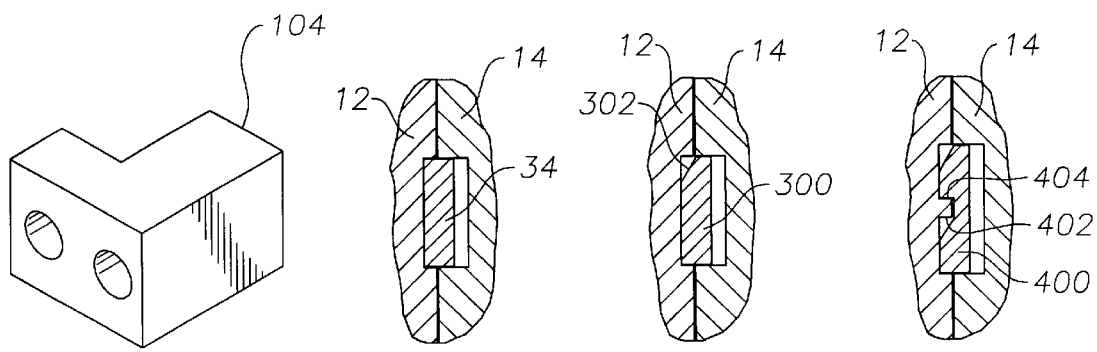
FIG. 8 is a perspective view, showing the wedge block used with the embodiment of FIG. 5 to lock the split ring securing means in its locked position.
FIG. 15 is an enlarged elevation view, partially in section, showing details of the cross section of the split ring securing means.
FIG. 16 is an enlarged elevation view, partially in section, showing details of the cross section of an alternative embodiment of the split ring securing means.
FIG. 17 is an enlarged elevation view, partially in section, showing details of the cross section of an alternative embodiment of the split ring securing means.

FIG. 15 shows the rectangular cross section that is typical of split ring 34 as well as split rings 102 and 202. An alternative form for a split ring 300 in shown in FIG. 16 with a tapered shoulder 302 formed on its upper surface to aid in insertion of pin connection member 12 into box connection member 14 if it desired to not retain split ring prior to insertion. A second alternative form for a split ring 400 in shown in FIG. 17 with a groove 402 formed on its inner surface to coact with a lip 404 on pin connection member 12 to provide additional bearing surface.

A fourth embodiment of the present invention is shown in FIGS. 18–22 that is similar to the previous embodiments in using a securing means in the form of a split ring to secure the pin and box connection members together and provides the additional feature of a means to preload the connection after the split ring is secured in its locked position. The split ring is formed to be biased inward, i.e., in its relaxed position it is retracted to the inner wall of the pin connection member recess.

Figure 18:
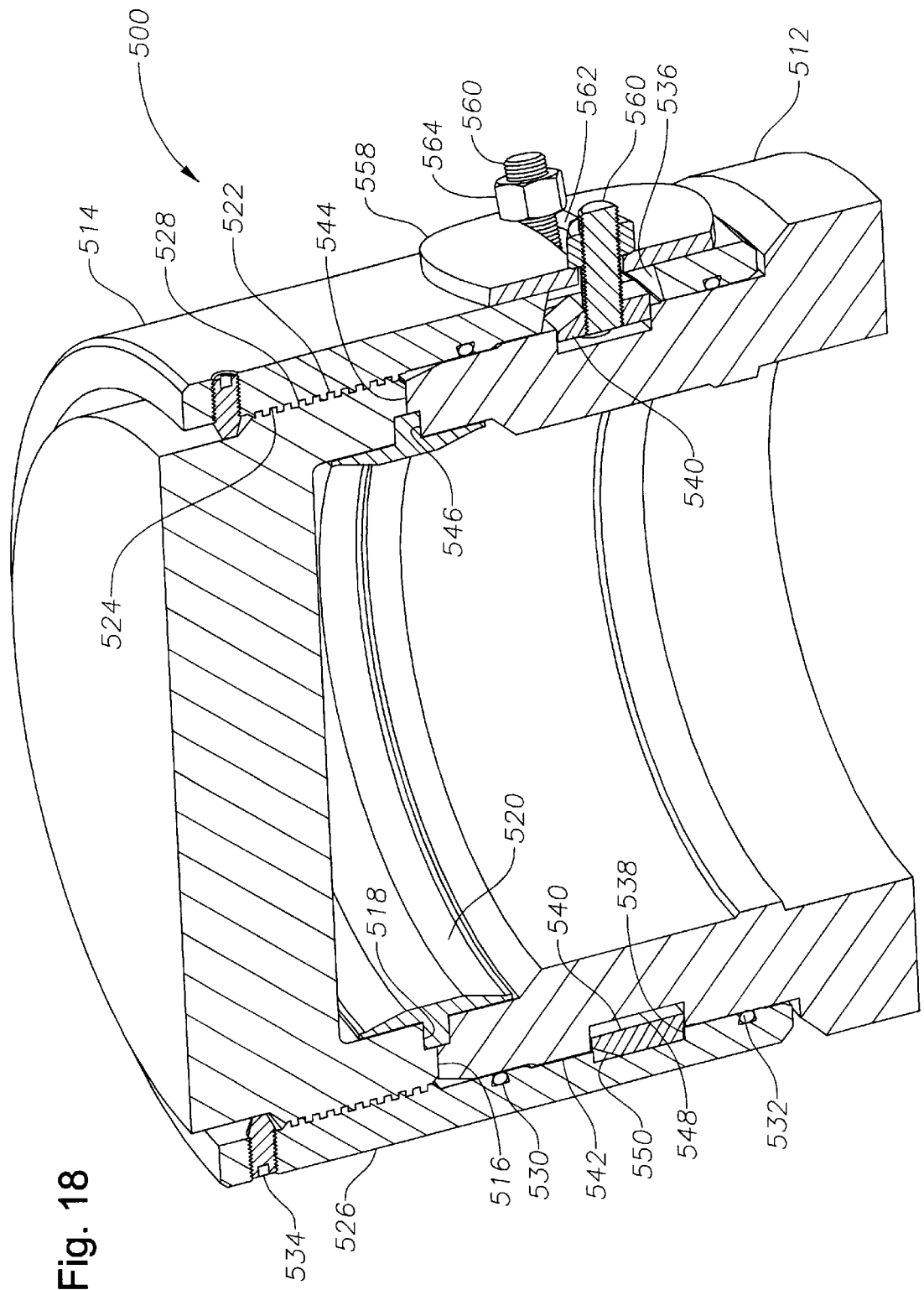
FIG. 18 is a perspective view, partially in section, of the fourth embodiment of the connector of the present invention showing the details of the connector and securing means.
Figure 19:
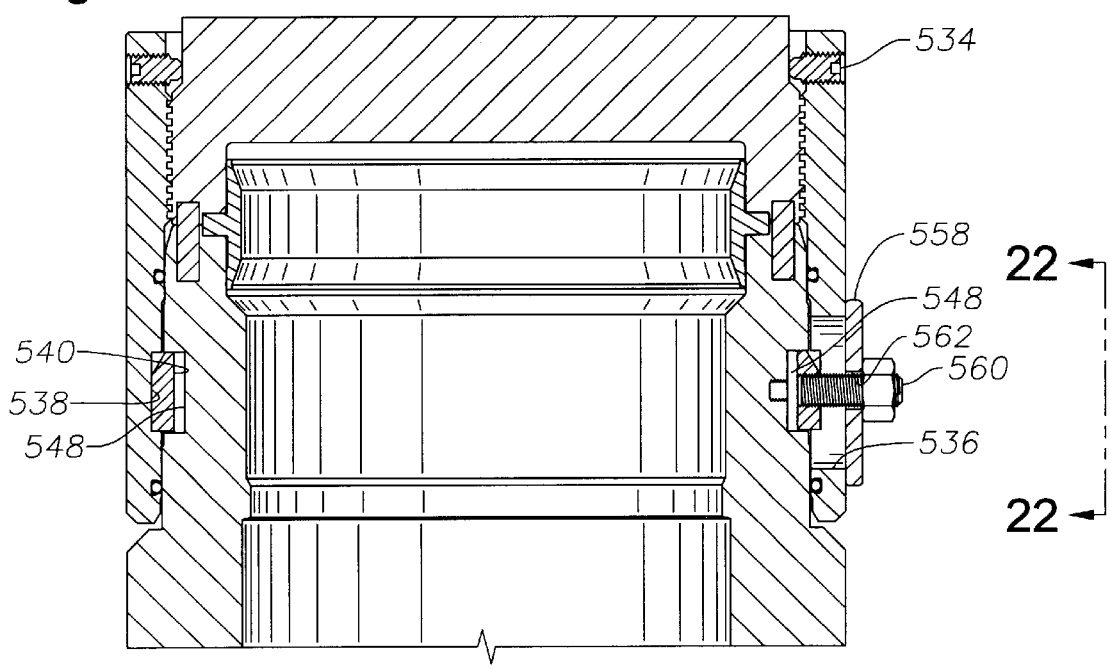
FIG. 19 is a sectional view showing details of the fourth embodiment.

Referring to FIGS. 18 and 19, connector 500 includes pin connection member 512 inserted into box connection member 514 in sealing engagement. Pin connection member 512 and box connection member 514 are generally tubular members. Box connection member 514 is shown with a closed end but could have alternate end connections as threads, flanges or clamp hubs without departing from the scope of the present invention. Similarly, box connection member 514 could be the lower end of a wellhead housing or other pressure vessel.

Box connection member 514 includes interior shoulder 516 that abuts pin connection member 512. Seal retainer groove 518 is formed on the interior of box connection member 514 to receive seal ring 520 that seals between pin connection member 512 and box connection member 514. The exterior of box connection member 514 includes pin or male thread 522 that mates with box or female thread 524 on the interior of outer sleeve 526 to form threaded connection 528 between outer sleeve 526 and box connection member 514. Threaded connection 528 is used a preloading means for connector 500 in a manner to be described hereinafter.

Outer sleeve 526 extends beyond the end of box connection member 514 and is adapted to receive pin connection member 512 in sealing engagement. Additional sealing means in the form of seal rings 530 and 532 are provided on the interior of outer sleeve 526. Seal ring 530 acts as a backup pressure seal ensuring pressure integrity between pin connection member 512 and box connection member 514 when locked together. Seal ring 532 acts as a barrier seal or "trash" seal to preclude debris from fouling the seal area. The upper end of outer sleeve 526 includes a plurality of radially directed set screws 534 that engage the upper end of box connection member 514 and lock outer sleeve 526 in position. Box connection member 514 includes aperture or inspection window 536 extending through its outer wall. Recess or groove 538 is formed on the interior of outer sleeve 526 to receive securing means or split ring 540.

Pin connection member 512 includes exterior seal surface 542 formed on its exterior to fit in close sealing engagement with seal rings 530 and 532 of outer sleeve 526 and box connection member 514 when pin connection member 512 is inserted into box connection member 514 and outer sleeve 526. The outer end of pin connection member 512 includes end shoulder 544 that engages interior shoulder 516. Seal retainer groove 546 is formed in end shoulder 544 and receives seal gasket 520. Recess or groove 548 is formed on the exterior on pin connection member 512 to accept split ring 540. Outer sleeve 526 is positioned initially on box connection member 514 so that recesses 538 and 548 will be diametrically opposite one another when pin connection member 512 is fully inserted into box connection member 514.

Figure 20:
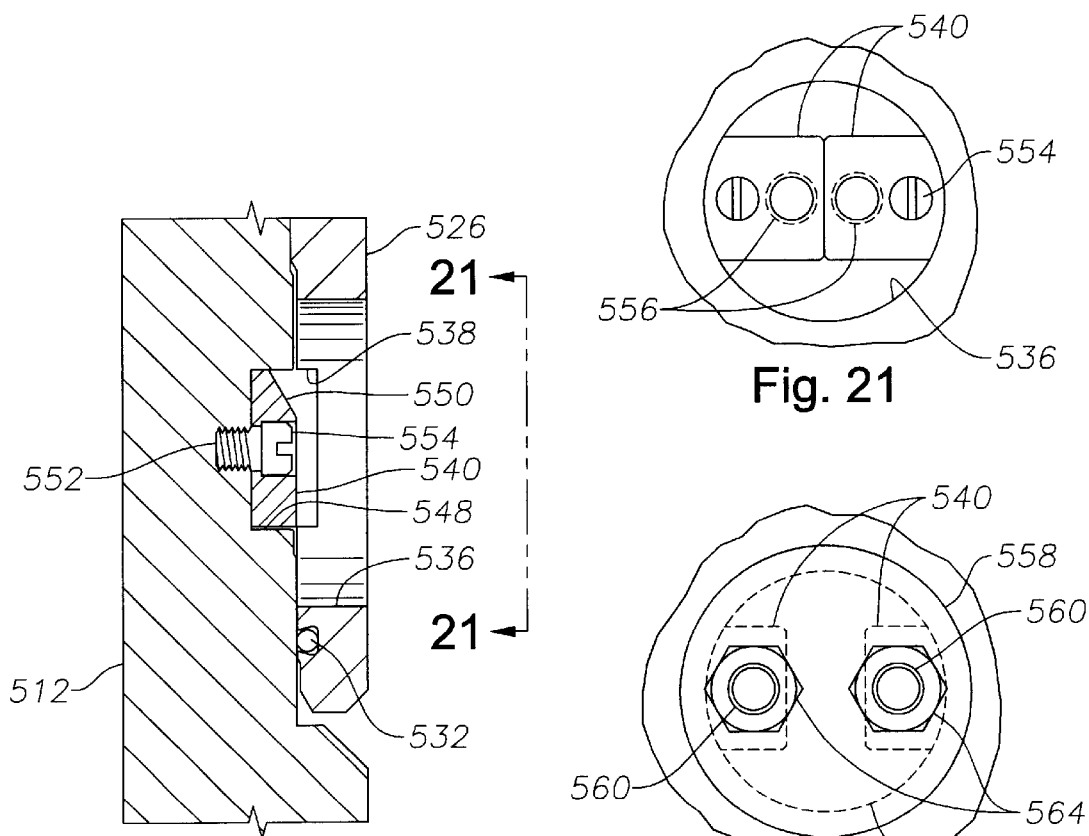
FIG. 20 is a partial sectional view, showing the details of the retainer means used to retain the split ring in the unlocked position.
Figure 21:
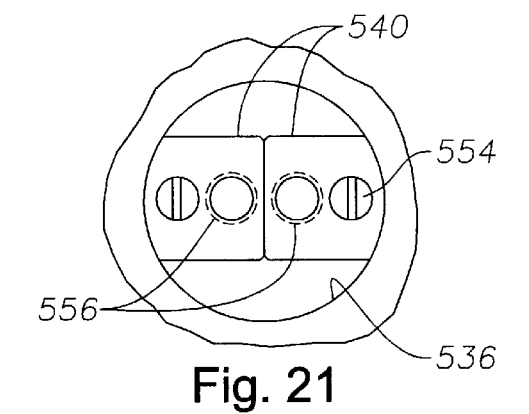
FIG. 21 is an elevation view, taken along lines 21—21 of FIG. 20 showing split ring in the retained position.

Referring to FIGS. 20 and 21, details of the construction and fit of split ring 540 to pin connection member 512 are shown. Split ring 540 is of a generally rectangular cross section with beveled upper shoulder 550 and is formed to be a close fit in recess 548 of pin connection member 512 in its relaxed position. Retainer means including threaded holes 552 in recess 548 and threaded fasteners 554 are provided to ensure split ring 540 remains in its relaxed or contracted state during insertion of pin connection member 512 into box connection member 514.

Figure 22:
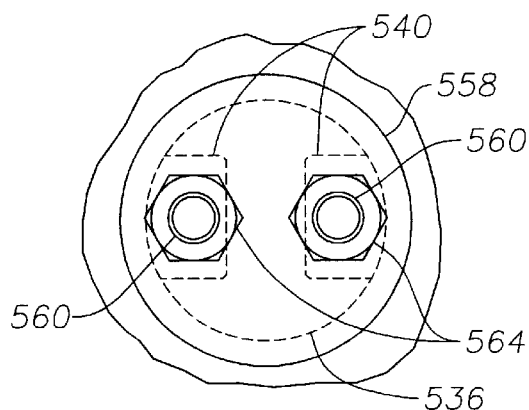
FIG. 22 is an elevation view, taken along lines 22—22 of FIG. 19 showing the split ring held in the locked position by the cover plate.

In the field, as pin connection member 512 is inserted into box connection member 514, split ring 540 is retained in the position shown in FIG. 20. As pin connection member 512 is inserted into box connection member 514, pin connection member 512 and box connection member 514 are rotated so that the ends of split ring 540 are aligned with inspection window 536, as shown in FIGS. 18 and 19. Threaded fasteners 554 are then removed. Locking means in the form of threaded holes 556, located adjacent the ends of split ring 540, and cover plate 558 are used to lock split ring 540 in position. Threaded studs 560 are threaded into threaded holes 556 through inspection window 536 and split ring 540 is spread apart until threaded studs 560 will pass through holes 562 in cover plate 558. The spacing of holes 562 in cover plate 558 acts as a locking means by holding split ring 540 in its expanded or locked position. This ensures split ring 540 will stay in its expanded position wherein it lies approximately half in each of recesses 538 and 548 and thereby locks pin connection member 512 to box connection member 514. Nuts 564 are then threaded onto studs 560 and tightened to secure cover plate 558 in the position shown in FIGS. 18 and 19. An external view of this engagement is shown in FIG. 22. Alternatively, in place of holes 562 a slot could be used. In this case studs 560 would be used to spread split ring 540 and then nuts 564 tightened against cover plate 558 to maintain split ring 540 in the spread or engaged position.

With split ring locked in position by cover plate 558, threaded connection 528 may be used to preload connector 500. Set screws 534 are loosened and outer sleeve 526 may be rotated so that it moves away from pin connection member 512 to induce a compressive preload force into split ring 540 and recesses 538 and 548. Set screws 528 may then be tightened to ensure outer sleeve 526 remains in its preloaded position. If it is desired to disconnect pin connection member 512 from box connection member 514, cover plate 558, studs 560 and nuts 564 are removed, split ring 540 is secured in its retracted position and pin connection member 512 is pulled from box connection member 514.

Although this embodiment has been described using an inwardly biased split ring, it will be obvious to those of ordinary skill in the art that this embodiment could be modified to use an outwardly biased or hinged split ring as used in the previous embodiments. Such modifications are envisioned and within the scope of this invention.

The construction of our connector for securing conduits in end to end relationship will be readily understood from the foregoing description and it will be seen that we have provided a connector for securing conduits in end to end sealing relationship that is easily connected and released and provided a connector that allows visual verification that the connector is secured and locked. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A connector for securing conduits in end to end relationship, comprising:
   a pin connection member and a box connection member, said pin and box connection members being adapted for said pin connection member to be inserted into said box connection member;
   a split ring for securing said pin and box connection members together after insertion;
   said pin and box connection members having complementary recesses diametrically opposite one another for receiving said split ring when said pin connection member engages said box connection member;
   said split ring is biased to an unlocked position wherein said pin connection member may be inserted in said box connection member without said split ring engaging said complementary recess of said box connection member, said split ring being moveable to a locked position wherein said pin and box connection members are secured together;
   said box connection member having an aperture for accessing said split ring after insertion of said pin connection member into said box connection member;
   a locking means cooperating with said split ring for locking said split ring in said locked position; and,
   a preloading means to allow said complementary recesses of said pin and box to be axially moveable with respect to one another after said split ring is in said locked position and said pin and box connection members are secured together.

2. A connector for securing conduits in end to end relationship according to claim 1, wherein:
   said preloading means includes an outer sleeve positioned on said box connection member;
   said outer sleeve engaging said box connection member with a thread connection thereby allowing relative axial movement between said complementary recesses of said pin and box connection members when said outer sleeve is rotated with respect to said box connection member.

3. A connector for securing conduits in end to end relationship according to claim 2, further comprising:
   a sealing means forming a pressure tight connection between said pin and box connection members after said securing means is engaged.

4. A connector for securing conduits in end to end relationship according to claim 3, wherein:
   said locking means is a cover plate secured to the ends of said split ring;
   said cover plate including a plurality of holes therein;
   said split ring includes a pair of holes formed in said split ring, said holes receiving threaded studs therein that extend radially outwardly and through said holes in said cover plate to maintain said split ring in said locked position;
   said threaded studs receiving nuts on their outer ends whereby tightening of said nuts urges said cover plate into engagement with the exterior of said box connection member.

5. A connector for securing conduits in end to end relationship according to claim 4, further comprising:
   a retainer means formed in said pin connection member, said retainer means retaining said split ring in said unlocked position prior to insertion of said pin connection member into said box connection member; and,
   said retainer means is accessible through said aperture of said box connection member.

6. A connector for securing conduits in end to end relationship according to claim 5, wherein said retainer means includes:
   a plurality of holes formed in said pin connection member, said holes receiving fasteners that engage complementary holes formed in said split ring adjacent said open ends of said split ring.

7. A connector for securing conduits in end to end relationship according to claim 6, wherein:
   said plurality of holes formed in said pin connection member and said fasteners are threaded.

8. A connector for securing conduits in end to end relationship according to claim 1, wherein:
   said split ring has at least one articulated joint.

9. A connector for securing conduits in end to end relationship according to claim 8, wherein:
   said preloading means includes an outer sleeve positioned on said box connection member;
   said outer sleeve engaging said box connection member with a thread connection thereby allowing relative axial movement between said complementary recesses of said pin and box connection members when said outer sleeve is rotated with respect to said box connection member.

10. A connector for securing conduits in end to end relationship according to claim 9, further comprising:

a sealing means forming a pressure tight connection between said pin and box connection members after said securing means is engaged.

11. A connector for securing conduits in end to end relationship according to claim 10, wherein:

said locking means is a cover plate secured to the ends of said split ring;

said cover plate including at least one hole therein;

said split ring includes a pair of holes formed in said split ring, said holes receiving threaded studs therein that extend radially outwardly and through said at least one hole in said cover plate to maintain said split ring in said locked position;

said threaded studs receiving nuts on their outer ends whereby tightening of said nuts urges said cover plate into engagement with the exterior of said box connection member.

12. A connector for securing conduits in end to end relationship according to claim 11, further comprising:

a retainer means formed in said pin connection member, said retainer means retaining said split ring in said unlocked position prior to insertion of said pin connection member into said box connection member; and, said retainer means is accessible through said aperture of said box connection member.

13. A connector for securing conduits in end to end relationship according to claim 12, wherein said retainer means includes:

a plurality of holes formed in said pin connection member, said holes receiving fasteners that engage complementary holes formed in said split ring adjacent said open ends of said split ring.

14. A connector for securing conduits in end to end relationship according to claim 13, wherein:

said plurality of holes formed in said pin connection member and said fasteners are threaded.

15. A connector for securing conduits in end to end relationship, comprising:

a pin connection member and a box connection member, said pin and box connection members being adapted for said pin connection member to be inserted into said box connection member;

a split ring for securing said pin and box connection members together after insertion;

said pin and box connection members having complementary recesses diametrically opposite one another for receiving said split ring means when said pin connection member engages said box connection member;

said split ring is biased to a locked position wherein said pin connection member may not be inserted in said box connection member without said split ring being contracted to and retained in an unlocked position prior to insertion, said split ring being moveable to a locked position wherein said pin and box connection members are secured together;

said box connection member having an aperture for accessing said split ring after insertion of said pin connection member into said box connection member;

a locking means cooperating with said split ring for locking said split ring in said secured position; and, a preloading means to allow said complementary recesses of said pin and box to be axially moveable with respect to one another after said split ring is in said locked position wherein said pin and box connection members are secured together.

16. A connector for securing conduits in end to end relationship according to claim 15, wherein:

said preloading means includes an outer sleeve positioned on said box connection member;

said outer sleeve engaging said box connection member with a thread connection thereby allowing relative axial movement between said complementary recesses of said pin and box connection members when said outer sleeve is rotated with respect to said box connection member.

17. A connector for securing conduits in end to end relationship according to claim 16, further comprising:

a sealing means forming a pressure tight connection between said pin and box connection members after said securing means is engaged.

18. A connector for securing conduits in end to end relationship according to claim 17, wherein:

said locking means is a cover plate secured to the ends of said split ring;

said cover plate including at least one hole therein;

said split ring includes a pair of holes formed in said split ring, said holes receiving threaded studs therein that extend radially outwardly and through said at least one hole in said cover plate to maintain said split ring in said locked position;

said threaded studs receiving nuts on their outer ends whereby tightening of said nuts urges said cover plate into engagement with the exterior of said box connection member.

19. A connector for securing conduits in end to end relationship according to claim 18, further comprising:

a retainer means formed in said pin connection member, said retainer means retaining said split ring in said unlocked position prior to insertion of said pin connection member into said box connection member; and, said retainer means is accessible through said aperture of said box connection member.

20. A connector for securing conduits in end to end relationship according to claim 19, wherein said retainer means includes:

a plurality of holes formed in said pin connection member, said holes receiving fasteners that engage complementary holes formed in said split ring adjacent said open ends of said split ring.

21. A connector for securing conduits in end to end relationship according to claim 20, wherein:

said plurality of holes formed in said pin connection member and said fasteners are threaded.

* * * * *

UNITED STATES PATENT AND TRADEMARK OFFICE
CERTIFICATE OF CORRECTION

PATENT NO. : 6,695,356 B2
DATED : February 24, 2004
INVENTOR(S) : Brockmann et al.

It is certified that error appears in the above-identified patent and that said Letters Patent is hereby corrected as shown below:

Column 4,
Line 64, after the word "retaining" please change "Sleeve" to -- sleeve --.

Column 5,
Line 33, after the word "end" please change "off" to -- of --.

Column 6,
Line 31, after the word "a" please change "disposed" to -- retaining --.

Signed and Sealed this

First Day of June, 2004

JON W. DUDAS
*Acting Director of the United States Patent and Trademark Office*